United States Patent
Sendonaris et al.

(10) Patent No.: US 9,720,071 B2
(45) Date of Patent: Aug. 1, 2017

(54) MITIGATING EFFECTS OF MULTIPATH DURING POSITION COMPUTATION

(71) Applicant: NextNav, LLC, Sunnyvale, CA (US)

(72) Inventors: Andrew Sendonaris, Los Gatos, CA (US); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 56 days.

(21) Appl. No.: 14/882,652

(22) Filed: Oct. 14, 2015

(65) Prior Publication Data
US 2016/0109556 A1    Apr. 21, 2016

Related U.S. Application Data

(60) Provisional application No. 62/066,332, filed on Oct. 20, 2014.

(51) Int. Cl.
| | |
|---|---|
| *G01S 5/10* | (2006.01) |
| *G01S 19/22* | (2010.01) |
| *G01S 19/42* | (2010.01) |
| *G01S 5/02* | (2010.01) |

(52) U.S. Cl.
CPC ............ *G01S 5/10* (2013.01); *G01S 5/0215* (2013.01); *G01S 5/0273* (2013.01); *G01S 19/22* (2013.01); *G01S 19/428* (2013.01)

(58) Field of Classification Search
CPC .......... G01S 5/10; G01S 19/22; G01S 19/428; G01S 5/0215; G01S 5/0273; H04W 64/00
See application file for complete search history.

(56) References Cited

U.S. PATENT DOCUMENTS

| | | | | |
|---|---|---|---|---|
| 2012/0149415 A1* | 6/2012 | Valaee | ................. | H04W 64/00 455/507 |
| 2014/0375493 A1* | 12/2014 | Weisenburger | ......... | G01S 19/48 342/357.3 |
| 2016/0290805 A1* | 10/2016 | Irish | ........................ | G01S 19/22 |

OTHER PUBLICATIONS

Robust Positioning Systems in the Presence of Outliers Under Weak GPS Signal Conditions, Kia Fallahi, Member, IEEE, Chi-Tsun Cheng, Member, IEEE, and Michel Fattouche.*
Form PCT/ISA/220, PCT/US15/55437, "Notification of Transmittal of the International Search Report and the Written Opinion of the International Searching Authority, or the Declaration", 1 page(s); Form PCT/ISA/210, PCT/US15/55437, "International Search Report", 4 page(s); EPO Form P04A42, PCT/US15/55175, "Information on Search Strategy", 1 page(s); Form PCT/ISA/237, PCT/US15/55437, "Written Opinion of the International Searching Authority", 6 page(s). Date of Mailing Jan. 12, 2016.
Fallahi K et al, "Robust Positioning Systems in the Presence of Outliers Under Weak GPS Signal Conditions", IEEE Systems Journal, IEEE, US, vol. 6, No. 3, pp. 401-413, XP011478838, ISSN: 1932-8184, DOI: 10.1109/JSYST.2011.2173622, Dated Sep. 1, 2012.

* cited by examiner

*Primary Examiner* — Chuong A Ngo

(57) ABSTRACT

Estimating an unknown position of a receiver. In some embodiment, trilateration techniques that quantify uncertainty in the estimate of the unknown position are applied. One such technique for estimating a two-dimensional or three-dimensional position of a receiver uses an L-1 norm computation instead of an L-2 norm computation.

34 Claims, 11 Drawing Sheets

MITIGATING EFFECTS OF MULTIPATH DURING POSITION COMPUTATION

RELATED APPLICATIONS

This application relates to U.S. Patent Application Ser. No. 62/066,332, filed Oct. 20, 2014, entitled MITIGATING EFFECTS OF MULTIPATH DURING POSITION COMPUTATION, the content of which is hereby incorporated by reference herein in its entirety.

FIELD

Various embodiments relate to wireless communications, and more particularly, to methods, systems, means and machine-readable media for estimating one or more positions of a receiver using signals received from a network of transmitters.

BACKGROUND

Quickly and accurately estimating locations of things (e.g., receivers) in a geographic area can be used to speed up emergency response times, track business assets, and link consumers to nearby businesses. Various techniques are used to estimate the position of a thing in a geographic area. One such technique is trilateration, which is the process of using geometry to estimate the position of the thing using distances traveled by different signals that are transmitted from geographically-distributed transmitters and later received by that thing. Urban areas pose challenges that lengthen the time it takes to accurately estimate a thing's location. In an urban environment, the distances traveled by the different signals are longer than the actual distance between the thing and the transmitters that transmitted the different signals. These longer distances are the consequence of each signal reflecting off of buildings that are located between the thing and the transmitters, which creates a signal pathway that consists of multiple paths between consecutive reflections. Unfortunately, the longer distances caused by these "multipath" reflections cause result in less accurate estimates of the thing's position and/or longer periods of time during which a sufficiently-accurate estimate of the thing's position is computed. Accordingly, there is a need for improved techniques for mitigating the effects of multipath reflections on achieving timely and sufficiently-accurate estimates of a receiver's position.

SUMMARY

Various embodiments, but not necessarily all embodiments, described in this disclosure relate generally to methods, systems (e.g., networks, devices or components), means, and machine-readable media for estimating one or more positions of a receiver using signals received from a network of transmitters. Certain methods, systems, means and machine-readable media estimate latitude and longitude of a receiver's position using an objective function that calculates an L-1 norm of residuals. Other methods, systems, means and machine-readable media optionally use a second objective function that calculates an L-2 norm of residuals to estimate latitude and longitude of a receiver's position.

The details of one or more embodiments of the invention are set forth in the accompanying drawings and the description below.

BRIEF DESCRIPTION OF THE DRAWINGS

Like reference numbers and designations in the drawings indicate like elements.

DETAILED DESCRIPTION

Figure 1:
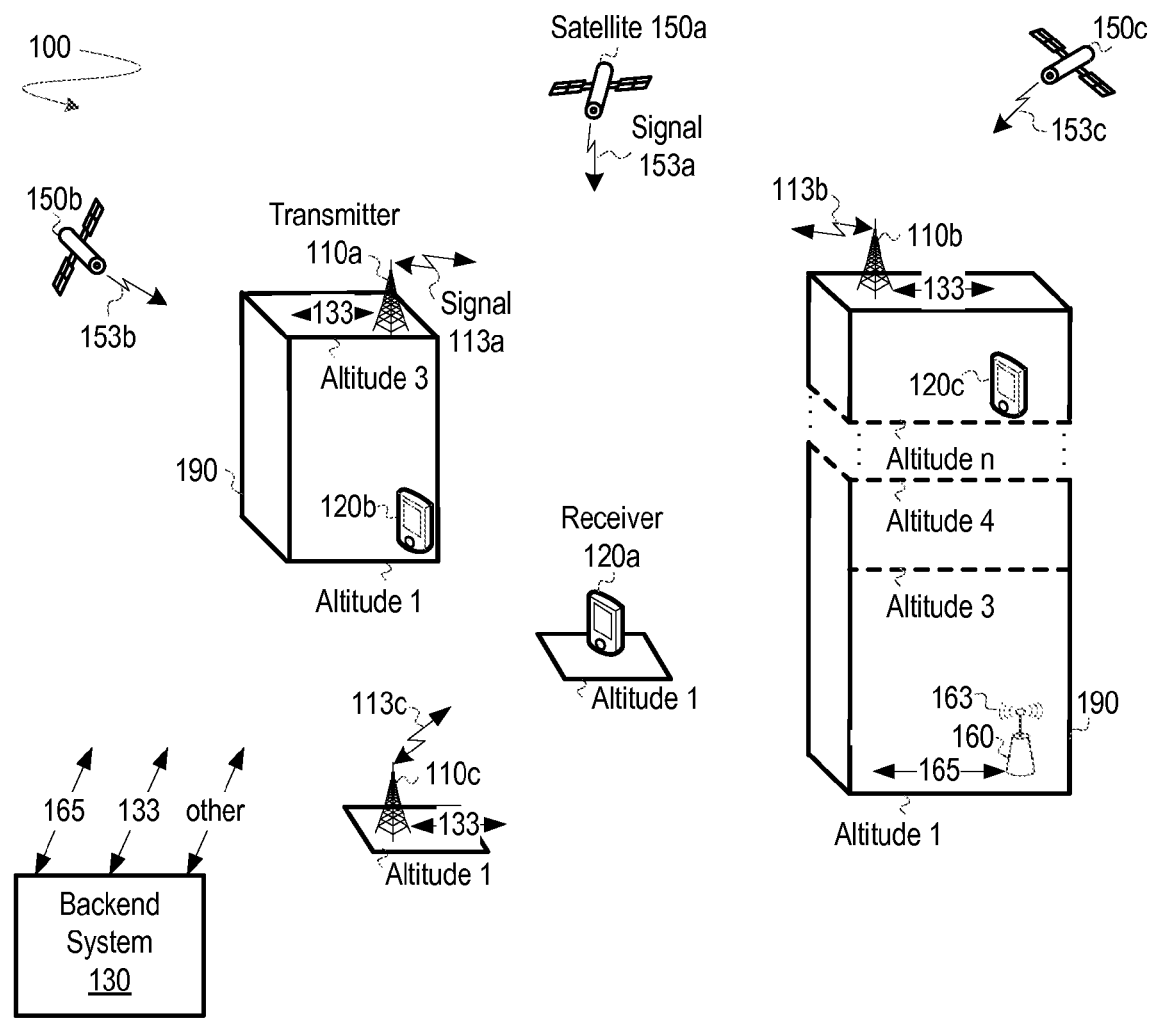
FIG. 1 illustrates a positioning system on which various embodiments may be implemented.

A receiver's position can be estimated using the measured distance traveled by positioning signals from satellites and/or terrestrial transmitters to the receiver. These measured distances are usually referred to as "pseudoranges". In certain environments, as discussed further below, the measured distances differ from true distances separating the receiver and the satellites or transmitters.

The differences between measured distances and true distances are often referred to as multipath errors, which arise when the positioning signals travel around objects (e.g., reflect off of buildings, internal features of buildings, etc.) that are located between the receiver and the satellites or transmitters that transmitted the positioning signals. Multipath error is a problem for positioning algorithms, mainly because it degrades the accuracy of the positioning solution. This disclosure describes several ways in which a receiver can mitigate the effects of multipath error. One approach for mitigating the effects of multipath error includes the use of an L-1 norm approach for modeling the ranging error in a trilateration objective function. This approach can be used by itself or with alternative approaches. One alternative approach uses an optimal time bias calculation to eliminate a time bias dimension in the space that needs to be searched to find a minimum of the objective function. Another alternative approach uses an altitude estimate from a sensor of the receiver or from other source to eliminate an altitude dimension in the space that needs to be searched to find a minimum of the objective function. Yet another alternative approach uses a global optimization function (e.g., based on a differential evolution approach) to find the minimum of the objective function. One other alternative approach uses an L-2 norm approach for modeling the ranging error in another trilateration objective function, and optionally determines which of the L-1 and L-2 approaches is preferred for modeling the ranging error.

Overview of Different Approaches

As mentioned above, a receiver's position can be estimated using the measured distance traveled by positioning signals from satellites and/or terrestrial transmitters to the receiver. These measured distances can take the form of:

$$p_k = r_k(x,y,z) + t_b + n_k, \ k=1 \ldots K,$$

where K is the number of transmitters, $p_k$ is the pseudorange for transmitter k, $r_k(x, y, z)$ is the distance of the receiver to transmitter k given the receiver's position at location (x, y, z), $t_b$ is the random time bias (offset) between the receiver and all transmitters, and $n_k$ is the random noise that is added.

Equation 1 below results when $n_k$ is modeled as a zero-mean white Gaussian noise—i.e., $N(0, \sigma_k^2)$:

$$(\hat{x}, \hat{y}, \hat{z}, \hat{t}_b) = \arg\min_{x,y,z,t_b} \sum_{k=1}^{K} w_k (p_k - r_k(x, y, z) - t_b)^2, \quad \text{Equation 1}$$

where $w_k = 1/\sigma_k^2$.

One problem with the above approach is that $n_k$ is not a zero-mean in an environment with multipath error, and instead has an unknown multipath bias. Therefore using Equation 1 or another approach that uses an L-2 norm calculation during trilateration leads to suboptimal solutions in environments that cause multipath error.

One could model the multipath bias by assuming that $n_k$ is distributed as $n_k \sim N(m_k, \sigma_k^2)$, where $m_k$ is the multipath bias of transmitter k, but estimating $m_k$ is difficult. Thus, better solutions are needed.

Use of an L-1 Norm Approach for the Ranging Error Estimate in a Trilateration Objective Function An "L-1 norm objective function" is an objective function that uses an L-1 norm computational approach to determine an optimal solution of an objective function, such as minimizing a sum of absolute errors or residuals. In a trilateration objective function, the absolute errors are errors between measured distances and true distances separating a receiver and corresponding satellites or transmitters. An example of an L-1 norm objective function is illustrated by Equation 2 below:

$$(\hat{x}, \hat{y}, \hat{z}, \hat{t}_b) = \arg\min_{x,y,z,t_b} \sum_{k=1}^{K} w_k |p_k - r_k(x, y, z) - t_b|, \quad \text{Equation 2}$$

where $$w_k = \frac{1}{\sigma_k}.$$

One reason why an L-1 norm approach (e.g., Equation 2) performs better than an L-2 norm approach (e.g., Equation 1), is that an L-1 norm objective function is influenced less by large multipath errors than an L-2 norm objective function. For example, the L-2 norm objective function shown by Equation 1 attempts to minimize the largest multipath error, which is squared, and this which leads to a large influence from signals measurements with large multipath error. On the other hand, the L-1 norm objective function shown by Equation 2 reduces the effect of large multipath error by not squaring it.

In one embodiment, an L-1 norm objective function may be used under certain circumstances, and an L-2 norm objective function may be used under other circumstances, depending on whether one approach is better suited for the receiver's environment. For example, an L-1 norm objective function may be used in an environment with a threshold amount of known or detectable multipath error. Examples of such environments include "urban canyons" (i.e., cities with tall buildings) and inside buildings. On the other hand, an L-2 norm objective function could be used in other environments with less multipath error.

There are various ways to select the best objective function. For example, selection of the best objective function could be accomplished by considering geographic conditions, including a known geographic region of the receiver—e.g., a geographic region determined by the location of transmitters, or where signals of opportunity (satellite, Wi-Fi, Bluetooth, other signals of opportunity) received by the receiver originate. By way of another example, selection of the best objective function could be accomplished by considering whether the receiver is indoors or outdoors. Alternatively, selection of the best objective function could be accomplished by considering signal conditions, including characteristics of signals associated with multipath error.

Other approaches described below may be used with the above approaches. It is to be understood, however, that these approaches need not always be used with the L-1 norm approach.

Calculate the Time Bias Optimally

Time bias may be calculated to minimize the number of dimensions that need to be searched in order to determine a minimum of an objective function like an L-1 norm objective function or an L-2 norm objective function.

In one embodiment for use with an L-2 norm objective function, an optimal time bias that helps minimize the objective function is given by the weighted mean of range error residuals as follows:

$$\hat{t}_b = \Sigma_{k=1}^{K} w_k (p_k - r_k(x,y,z)) / \Sigma_{k=1}^{K}.$$

For an L-1 norm objective function, the optimal time bias is given by the weighted median of range error residuals as follows:

$$\hat{t}_b = \text{weigthed}_{median}(\{p_k - r_k(x,y,z)\}, \{w_k\}).$$

Using the above approach modifies Equation 1 and Equation 2 to Equation 1B and Equation 2B, respectively, as shown below:

$$(\hat{x}, \hat{y}, \hat{z}) = \underset{x,y,z}{\operatorname{argmin}} \sum_{k=1}^{K} w_k (p_k - r_k(x, y, z) - \hat{t}_b(x, y, z))^2 \quad \text{Equation 1B}$$

$$(\hat{x}, \hat{y}, \hat{z}) = \underset{x,y,z}{\operatorname{argmin}} \sum_{k=1}^{K} w_k |p_k - r_k(x, y, z) - \hat{t}_b(x, y, z)| \quad \text{Equation 2B}$$

Equations 1B and 2B eliminate a time bias dimension, which reduces the search space to three dimensions (x, y, z) instead of four dimensions (x, y, z, $t_b$). Consequently, faster and/or more accurate minimization processing is possible with the reduced search space made possible by Equations 1B and 2B.

Utilize an Altitude Estimate of the Receiver

In some receivers, an estimate of the receiver's altitude is available. The estimate may be obtained using various approaches known in the art, including those described in co-owned U.S. patent application Ser. No. 13/296,067, filed Nov. 14, 2011.

When an altitude estimate is available, an optimization algorithm may utilize the altitude estimate to reduce the search space by eliminating the need to search an altitude dimension. This results in reduced computational complexity in relation to using an L-1 norm or an L-2 norm objective function. It may additionally result in a lower position error.

If an altitude estimate $\hat{z}$ is available, Equations 1B and 2B can be simplified to Equations 1C and 2C, respectively, below:

$$(\hat{x}, \hat{y}) = \underset{x,y}{\operatorname{argmin}} \sum_{k=1}^{K} w_k (p_k - r_k(x, y, \hat{z}) - \hat{t}_b(x, y, \hat{z}))^2 \quad \text{Equation 1C}$$

$$(\hat{x}, \hat{y}) = \underset{x,y}{\operatorname{argmin}} \sum_{k=1}^{K} w_k |p_k - r_k(x, y, \hat{z}) - \hat{t}_b(x, y, \hat{z})| \quad \text{Equation 2C}$$

Equations 1C and 2C eliminate an altitude dimension, which reduces the search space to two dimensions (x, y) instead of three dimensions (x, y, z). Consequently, faster and/or more accurate minimization processing is possible with this approach.

Use a Global Optimization Function to Find the Minimum of the Objective Function Calculating the solution using the above equations may not be straightforward, because the objective function often has multiple local minima, and the global minimum should be used to deliver the most accurate position estimate. Common approaches to minimization (such as Newton-Raphson based methods) only find local minima, and rely on a good initial estimate. One solution uses a global optimization function, based on the concept of differential evolution, which is a particular type of a class of algorithms called genetic algorithms.

Using the Above Approaches

The approaches described above can be used independently of each other, or in any combination. In one implementation, only the L-1 norm approach might be used. In another implementation, the optimal time bias calculation plus differential evolution may be used with or without the L-1 norm approach. It is to be understood that any combination of the approaches is contemplated.

The above approaches can be utilized as is, or with extra information. For example, if the receiver has extra information about its position, orientation, or movement from on-board sensors (e.g., accelerometers, gyroscopes, or compasses), this information can be used with any or all of the approaches described above in order to improve the solution and/or the computational complexity of the solution.

Aspects Relating to Systems for Mitigating Effects of Multipath During Position Computation FIG. 1 illustrates a positioning system 100 for implementing the various approaches described herein. The positioning system 100 includes any number of receiver systems ("receivers") 120 that receive signals from and/or send signals to transmitter systems ("transmitters") 110, satellite systems ("satellites") 150, and/or other systems ("nodes") 160 via corresponding communication links 113, 153 and 163, respectively. The receivers 120 may also receive signals from and/or send signals to each other and a backend system ("backend") 130 (connectivity not shown). Communication between the transmitters 110 and the backend 130 may occur via communication links 133.

In some embodiments, the transmitters 110 transmit the signals 113 to the receivers 120 using one or more common multiplexing parameters—e.g. time slot, pseudorandom sequence, or frequency offset. Each of the signals 113 may carry different information that, once extracted by the receiver 120 or the backend 130, may identify the following: the transmitter that transmitted the signal; the latitude, longitude and altitude (LLA) of that transmitter; pressure, temperature and other atmospheric conditions at or near that transmitter; ranging information that is used to measure a distance to that transmitter; and other information.

The receivers 120 are depicted at different altitudes 1-n, and also depicted inside or outside buildings 190. Each of the receivers 120 may include a location computation engine (not shown) to determine positioning information based on the received signals 113, 153, and/or 163. The receivers 120 may include a signal processing component (not shown) that: demodulates received signals; estimates positioning information like travel time of the received signals based on estimated times of arrival (TOAs) for those signals, and measurements of range to the beacons based on the estimated travel times of the received signals; refines the positioning information; and uses the positioning information to estimate the position of the receiver 120 using processes for estimating the position like trilateration.

One of ordinary skill in the art will appreciate that methods described herein may be carried out using processors at any or all of the transmitters 110, the receivers 120, the backend 130, and other components of the system 100.

Example Transmitter Systems

Figure 2:
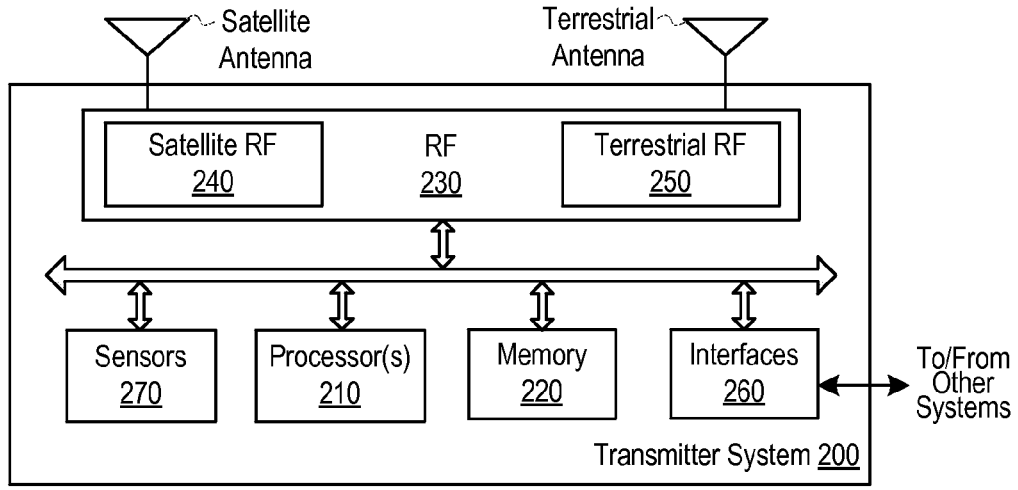
FIG. 2 provides details of a transmitter system on which signals may be generated and transmitted.

FIG. 2 provides details of a transmitter system ("transmitter") 200 on which signals may be generated and transmitted. The transmitter 200 may include a processor 210 that carries out signal processing (e.g., interpreting received signals and generating signals for transmission to other systems). Memory 220 may provide storage and retrieval of data and/or executable instructions for performing methodologies described herein.

The transmitter 200 includes satellite and a terrestrial antenna(s) for transmitting and receiving signals, and also includes RF components 230, which may include a satellite RF component 240 for receiving satellite signals and a terrestrial RF component 250 for generating and sending output signals to other systems like the receivers 120. Generation of signals may be carried out using analog/digital logic and power circuitry, signal processing circuitry, tuning circuitry, buffer and power amplifiers, and other components known in the art. The transmitter 200 may also include an interface 260 for exchanging information with other systems, and one or more environmental sensors 270 for sensing environmental conditions (e.g., pressure, temperature, humidity, wind, sound, or other) that may be compared to conditions sensed at a receiver when estimating a position of the receiver.

Example Receiver Systems

Figure 3:
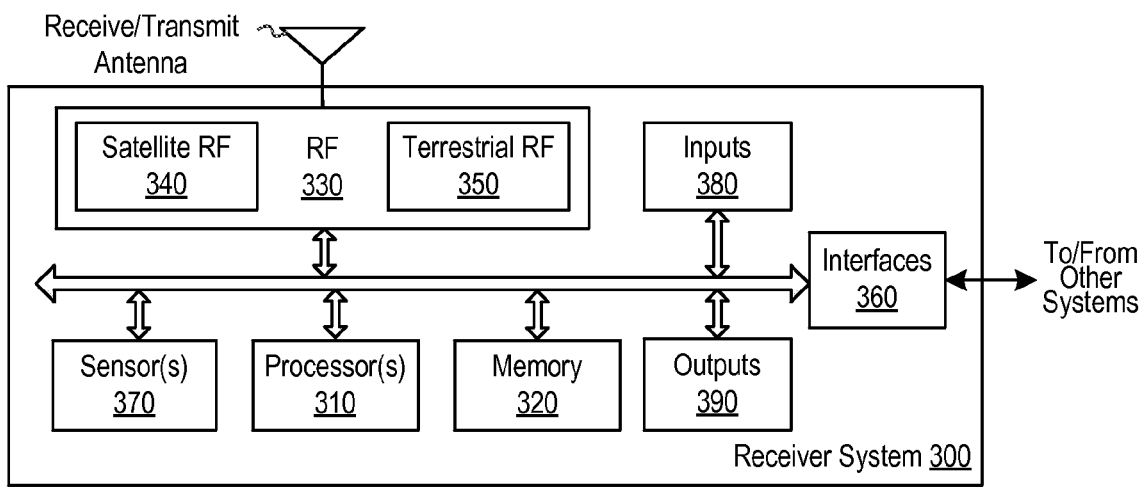
FIG. 3 provides details of a receiver system on which signals from beacons may be received and processed to extract information used to compute an estimated position of the receiver using an objective function.

FIG. 3 provides details of a receiver system ("receiver") 300, on which signals are received and processed to extract information used to compute an estimated position of the receiver 300. The receiver 300 includes RF components 330 that control the exchange of information with other systems. Signal processing occurs at a satellite RF component 340 (e.g., a GPS chip), a terrestrial RF component 350, or other suitable component, which use separate or shared resources such as antennas, RF circuitry, processors and the like to perform signal processing as is known in the art or otherwise disclosed herein. Memory 320 is coupled to a processor 310 to provide storage and retrieval of data and/or instructions relating to the various approaches described herein that may be executed by the processor 310. The processor 310 may form all or part of a positioning engine that determines positioning information from signaling received from other systems. The receiver 300 further includes one or more sensors 370 for measuring environmental conditions like pressure, temperature, humidity, inertial (e.g., acceleration, velocity, orientation), wind force, wind direction, light, sound, or other conditions associated with the receiver 300. The receiver 300 further includes input and output (I/O) components 380 and 390, which may include a keypad, touchscreen display, camera, microphone, speaker, or other components that permit a user to interact with the receiver 300.

Approaches for Mitigating Effects of Multipath During Position Computation

Various approaches for estimating position(s) of a receiver using signals received from a network of satellites and/or transmitters are described below. For simplicity, only transmitters are describes. However, these approaches also apply to satellites.

FIG. 4 through FIG. 9 different processes for estimating a position of a receiver.

Figure 4:
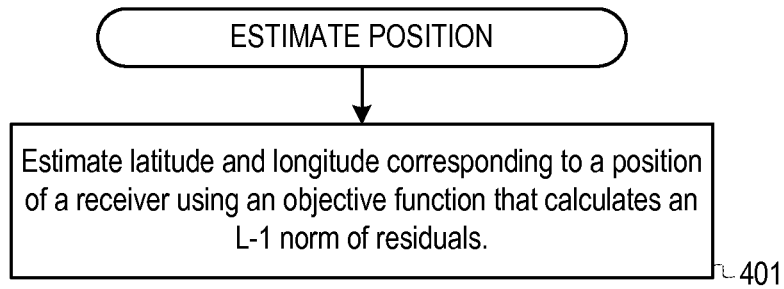
FIG. 4 depicts a process that estimates latitude and longitude of a position of a receiver using an objective function that calculates an L-1 norm of residuals.

FIG. 4 depicts a process that estimates latitude and longitude of a position of a receiver using an objective function that calculates an L-1 norm of residuals (401).

Figure 5:
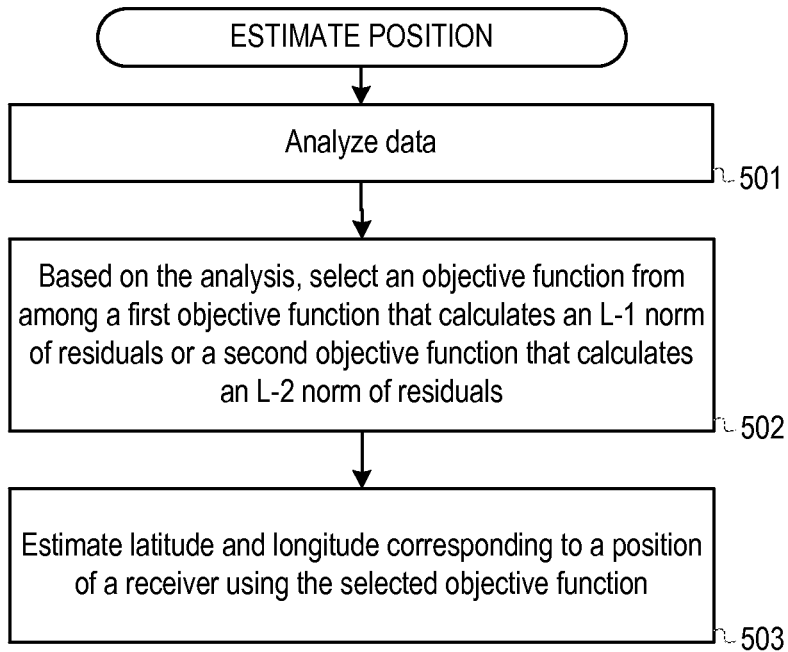
FIG. 5 depicts a process that estimates the position of a receiver using either a first objective function or a second objective function.

FIG. 5 depicts a process that estimates the position of a receiver using either a first objective function or a second objective function. The process shown in FIG. 5: analyzes data (501); based on the analysis, selects an objective function from among a first objective function that calculates an L-1 norm of residuals or a second objective function that calculates an L-2 norm of residuals (502); and estimates latitude and longitude of a position of a receiver using the selected objective function (503).

In one embodiment, analysis of data (501) may include:
(A) analysis of data specifying a geographical region of the receiver;
(B) analysis of data specifying whether the receiver is indoors or outdoors; and/or
(C) analysis of data specifying one or more characteristics of one or more signals received by the receiver from one or more transmitters.

This disclosure hereby includes an embodiment for each of: A alone; B alone; C alone; A and B; A and C; B and C; A, B and C; and any other combination of A, B and C.

By way of example, the analysis of data (501) may include analysis of a cell ID, one or more satellite signals, or one or more signals of opportunity (e.g., Wi-Fi, Bluetooth, or other signals of opportunity).

In one embodiment, selection of the objective function from the first and second objective functions (502) may include:
(A) selecting the first objective function when data specifying the geographical region of the receiver indicates that the receiver is located in a first type of environment, and/or selecting the second objective function when data specifying the geographical region of the receiver indicates that the receiver is located in a second type of environment (or is not located in the first type of environment);
(B) selecting the first objective function when data specifying the geographical region of the receiver indicates that the receiver is located in a first geographic region that includes more than a predefined number of buildings with heights that exceed a threshold height, and/or selecting the second objective function when the data specifying the geographical region of the receiver indicates that the receiver is located in a second geographic region that includes no more than the predefined number of buildings with heights that exceed the threshold height;
(C) selecting the first objective function when data specifying whether the receiver is indoors or outdoors indicates that the receiver is indoors, and/or selecting the second objective function when the data specifying whether the receiver is indoors or outdoors indicates that the receiver is outdoors;
(D) selecting the first objective function when data specifying one or more characteristics of one or more signals received by the receiver from one or more transmitters indicates that each of the one or more signals meets a predefined multipath condition, and/or selecting the second objective function when data specifying the one or more characteristics indicates that each of the one or more signals does not meet a predefined multipath condition (e.g., the predefined multipath condition specifies that there are more than N multipath signal components detected for that signal from that transmitter, where N can be any number like 3 or another number); and/or
(E) selecting the first objective function when data specifying one or more characteristics of one or more signals received by the receiver from one or more transmitters indicates that one or more pseudorange measurements of the one or more signals include a multipath error that exceeds a threshold amount of error, and/or selecting the second objective function when data specifying the one or more characteristics indicates that the one or more pseudorange measurements of the one or more signals do not include a multipath error that exceeds a threshold amount of error.

This disclosure hereby includes an embodiment for each of: A alone; B alone; C alone; D alone; E alone; A and B; A and C; A and D; A and E; B and C; B and D; B and E; C and D; C and E; D and E; A, B and C; A, B and D; A, B and E; A, C and D; A, C and E; A, D and E; B, C and D; B, C and E; B, D and E; C, D and E; A, B, C and D; A, B, C and E; B, C, D and E; A, B, C, D and E; and any other combination of A, B, C, D and E.

Figure 6:
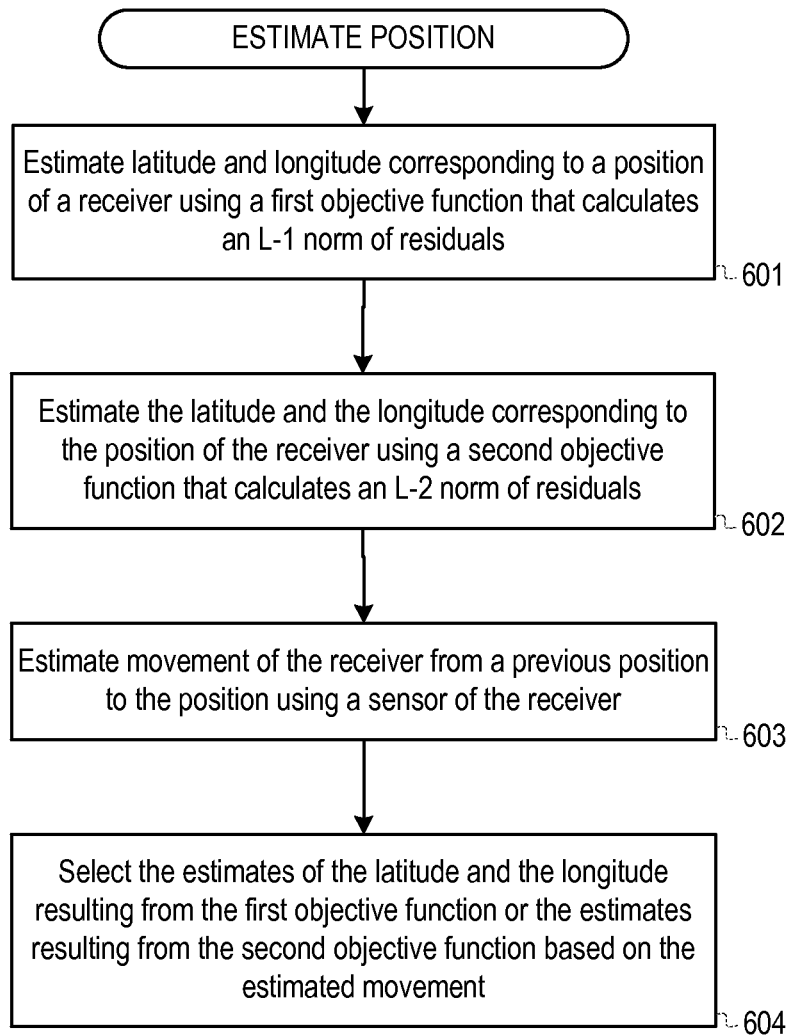
FIG. 6 depicts a process that estimates the position of a receiver using movement of the receiver and either a first objective function or a second objective function.

FIG. 6 depicts a process that estimates the position of a receiver using movement of the receiver and a first objective function or a second objective function. The process shown in FIG. 6: estimates latitude and longitude of a position of interest using a first objective function that calculates an L-1 norm of residuals (601); estimates latitude and the longitude corresponding to the position of interest using a second objective function that calculates an L-2 norm of residuals (602); estimates movement of the receiver from a previous position to the position of interest using a sensor of the receiver (603); and selects between the estimates of the latitude and longitude resulting from the first objective function and the estimates of the latitude and longitude resulting from the second objective function using the estimated movement (604). In one embodiment, the estimates of the latitude and longitude from the first objective function or the second objective function that are closest to the estimates based on the estimated movement are selected.

Figure 7:
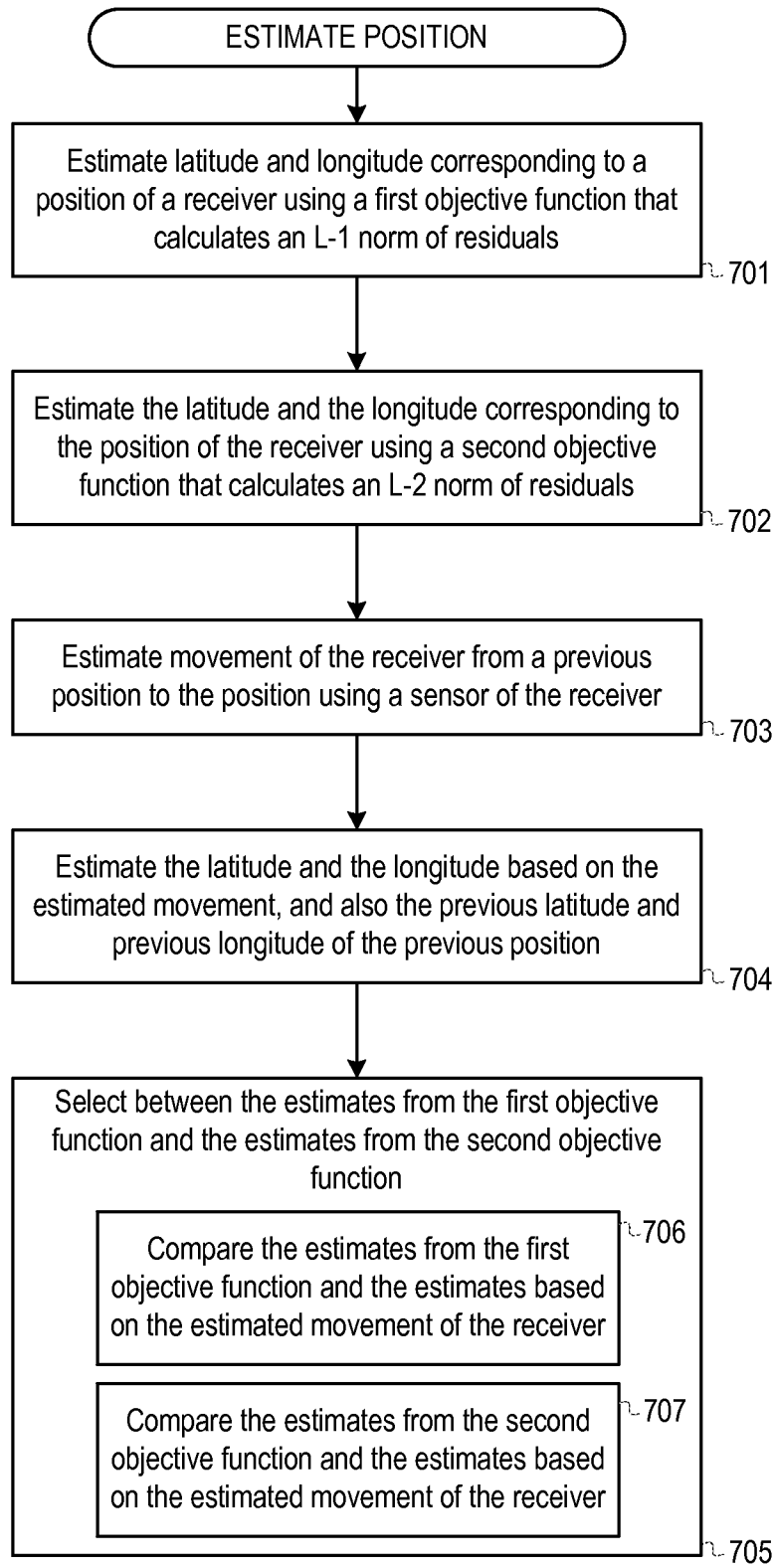
FIG. 7 depicts a process that estimates the position of a receiver using a first objective function and a second objective function.

FIG. 7 depicts a process that estimates the position of a receiver using a first objective function and a second objective function. The process shown in FIG. 7: estimates latitude and longitude of a position of interest using a first objective function that calculates an L-1 norm of residuals (701); estimates latitude and the longitude corresponding to the position of interest using a second objective function that calculates an L-2 norm of residuals (702); estimates movement of the receiver from a previous position to the position of interest using a sensor of the receiver (703); estimates the latitude and the longitude of the position of interest using on the estimated movement and the previous position (704); and selects between the estimates of the latitude and longitude resulting from the first objective function and the estimates of the latitude and longitude resulting from the second objective function (705). The selection may occur by comparing the estimates of the latitude and longitude resulting from the first objective function and the estimates of the latitude and longitude that are based on the estimated movement of the receiver (706), and further by comparing the estimates of the latitude and longitude resulting from the second objective function and the estimates that are based on the estimated movement of the receiver (707).

In one embodiment, differences between the estimates of the latitude and longitude resulting from the first objective function and the estimates of the latitude and longitude that are based on the estimated movement form a first combination of latitude and longitude differences. Similarly, differences between the estimates of the latitude and longitude from the second objective function and the estimates of the latitude and longitude that are based on the estimated movement form a second combination of latitude and longitude differences. The first and second combinations of latitude and longitude differences are compared, and the best combination of the first and second combinations (e.g., the smallest combined latitude and longitude differences) is selected. If the selected combination is the first combination, then the estimates of the latitude and longitude from the first objective function are selected (705). If the selected combination is the second combination, then the estimates of the latitude and longitude from the second objective function are selected (705).

In one embodiment for each of FIG. 6 and FIG. 7, the estimates based on the estimate movement are determined by adding the estimated movement to the previous latitude and longitude. Such estimated movement may be determined using various sensors known in the art that track movement, including inertial sensors.

Figure 8:
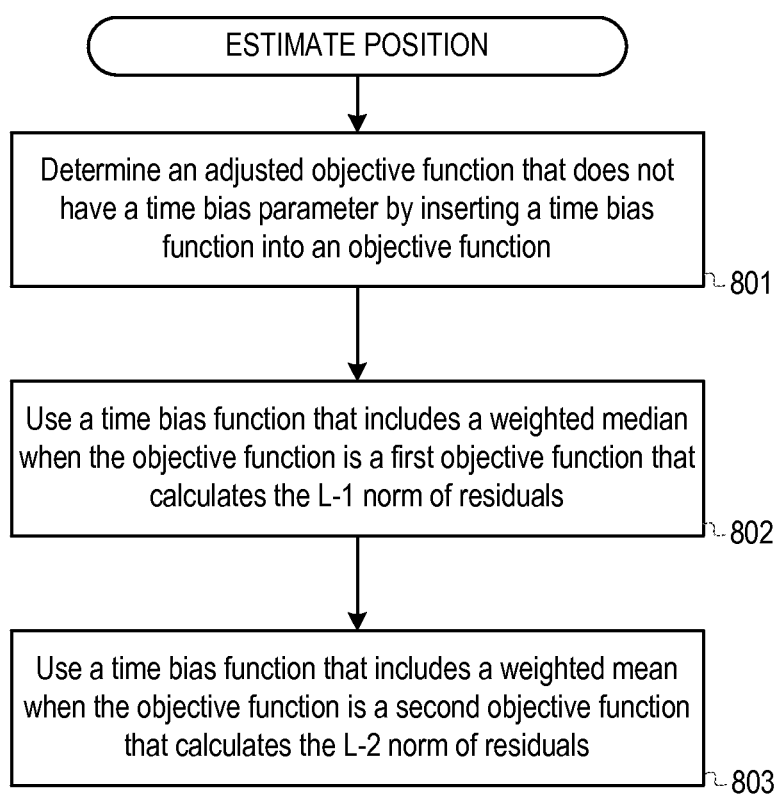
FIG. 8 depicts a process that estimates the position of a receiver using an objective function that is adjusted by a time bias function.

FIG. 8 depicts a process that estimates the position of a receiver using an objective function adjusted by a time bias function. The process shown in FIG. 8: determines an adjusted objective function that does not have a time bias parameter by inserting a time bias function into an objective function (801); uses a time bias function that includes a weighted median when the objective function is a first objective function that calculates the L-1 norm of residuals (802); and uses a time bias function that includes a weighted mean when the objective function is a second objective function that calculates the L-2 norm of residuals (803).

Figure 9:
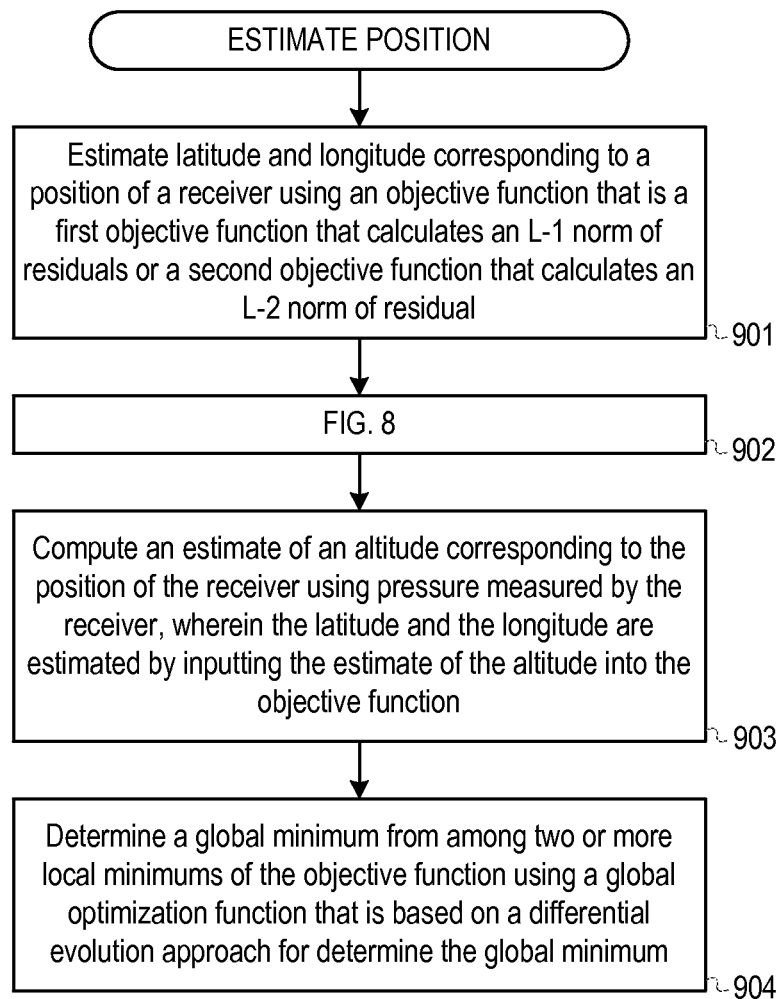
FIG. 9 depicts a process that estimates the position of a receiver using either a first objective function that is adjusted by a first time bias function, or a second objective function that is adjusted by a second time bias function.
Figure 10:
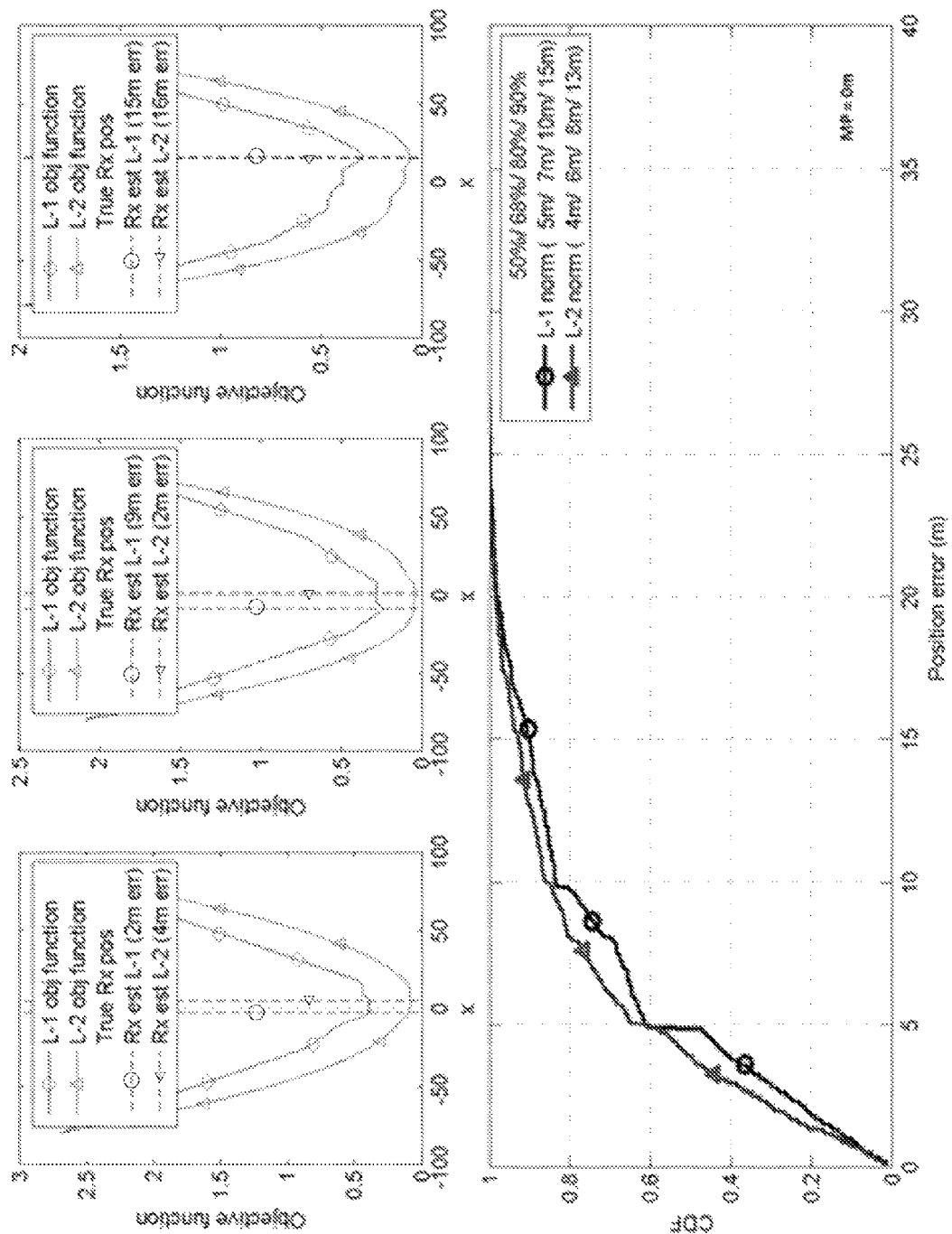
FIG. 10 depicts a first modeled scenario comparing two objective functions in which a multipath value is a first value.

FIG. 9 depicts a process that estimates the position of a receiver using either a first objective function adjusted by a first time bias function, or a second objective function adjusted by a second time bias function. The process shown in FIG. 9:

(A) estimates latitude and longitude of a position of a receiver using an objective function that is a first objective function that calculates an L-1 norm of residuals or a second objective function that calculates an L-2 norm of residuals (901);

(B) determines an adjusted objective function that does not have a time bias parameter by inserting a time bias function into the objective function, wherein the time bias function includes a weighted median when the objective function is the first objective function, and wherein the time bias function includes a weighted mean when the objective function is the second objective function that calculates an L-2 norm of residuals (902);

(C) computes an estimate of an altitude corresponding to the position of the receiver using pressure measured by the receiver, wherein the latitude and longitude of the position are estimated by inputting the estimate of the altitude into the objective function (903); and/or (D) determines a global minimum from among two or more local minimums of the objective function using a global optimization function that is based on a differential evolution approach for determine the global minimum (904).

This disclosure hereby includes an embodiment for each of: A alone; B alone; C alone; D alone; A and B; A and C; A and D; B and C; B and D; C and D; A, B and C; A, B and D; A, C and D; A, B, C and D; A, B, C and D; and any other combination of A, B, C and D.

Modeled Scenarios

Various modeled scenarios focusing on a simple one-dimensional position coordinate of a receiver (e.g., x=0 m position coordinate) are described in more detail below. Each scenario assumes there are four transmitters at locations x=−10 m, x=−5 m, x=8 m, and x=15 m, respectively. The transmitters and the receiver clocks are assumed to be synchronized, so there is no uncertainty in the time bias. The pseudoranges from all transmitters have a standard deviation of 10 m. All but one of the pseudoranges have zero mean multipath error. One pseudorange has a mean multipath error equal to "MP" meters, representing a case where the correspondence pseudorange measurement includes a multipath error. The value of MP is varied in the plots shown in FIG. 10 through FIG. 13 to show the effects of multipath on the position solution. In the plots, "CDF" designates a cumulative distribution function.

FIG. 10 through FIG. 13 show results for MP values (i.e., multipath error) of 0 m, 20 m, 40 m, and 60 m. As shown, when MP=0 m, an objective function using L-2 norm performs better than an objective function using L-1 norm, which is to be expected, since in this particular case, the L-2 norm approach matches the system model of zero mean Gaussian range errors. But, as MP increases, the objective function using L-1 norm eventually outperforms the objective function using L-2 norm. When MP=40 m and higher, the objective function using L-1 norm outperforms the objective function using L-2 norm by a wide margin.

As demonstrated by FIG. 10 through FIG. 13, the objective function using L-2 norm performs better than an objective function using L-1 norm when multipath error is below a threshold condition in a receiver's environment. By way of example, the threshold condition could be an amount of error that could be estimated before selecting either objective function based on known multipath characteristics of the environment. However, the objective function using L-1 norm performs better when certain levels of multipath error are present in the environment.

Figure 11:
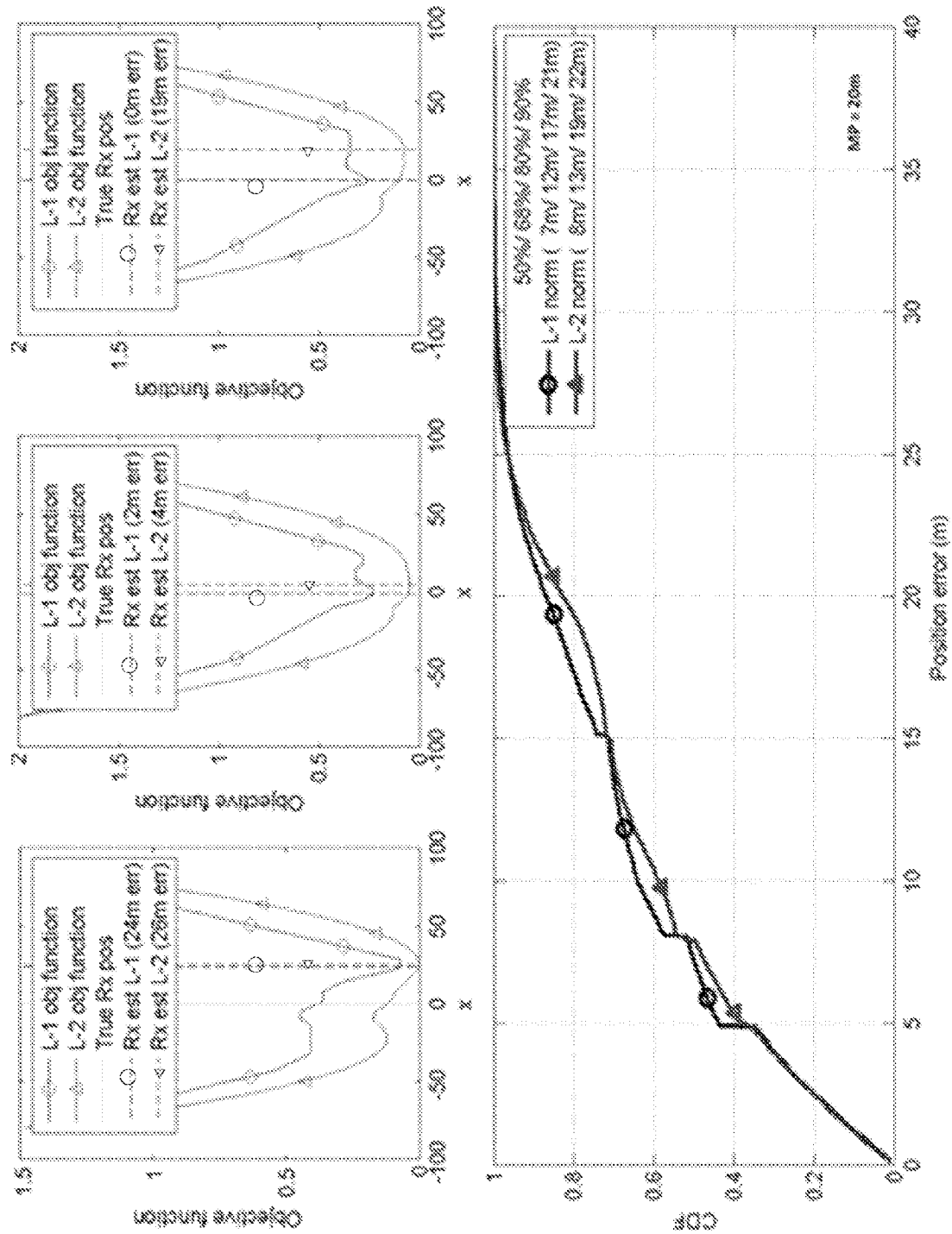
FIG. 11 depicts a second modeled scenario comparing two objective functions in which a multipath value is a second value.
Figure 12:
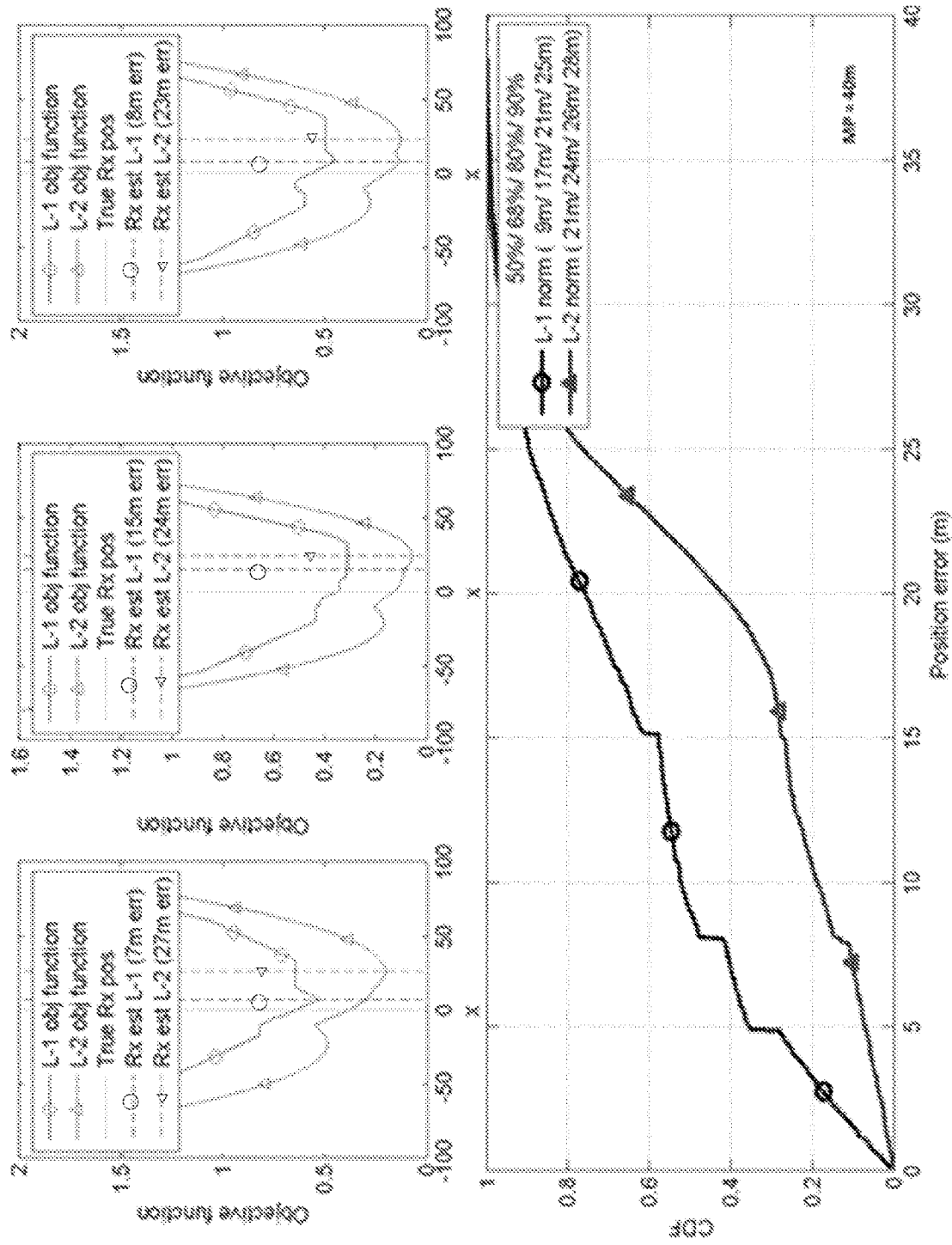
FIG. 12 depicts a third modeled scenario comparing two objective functions in which a multipath value is a third value.
Figure 13:
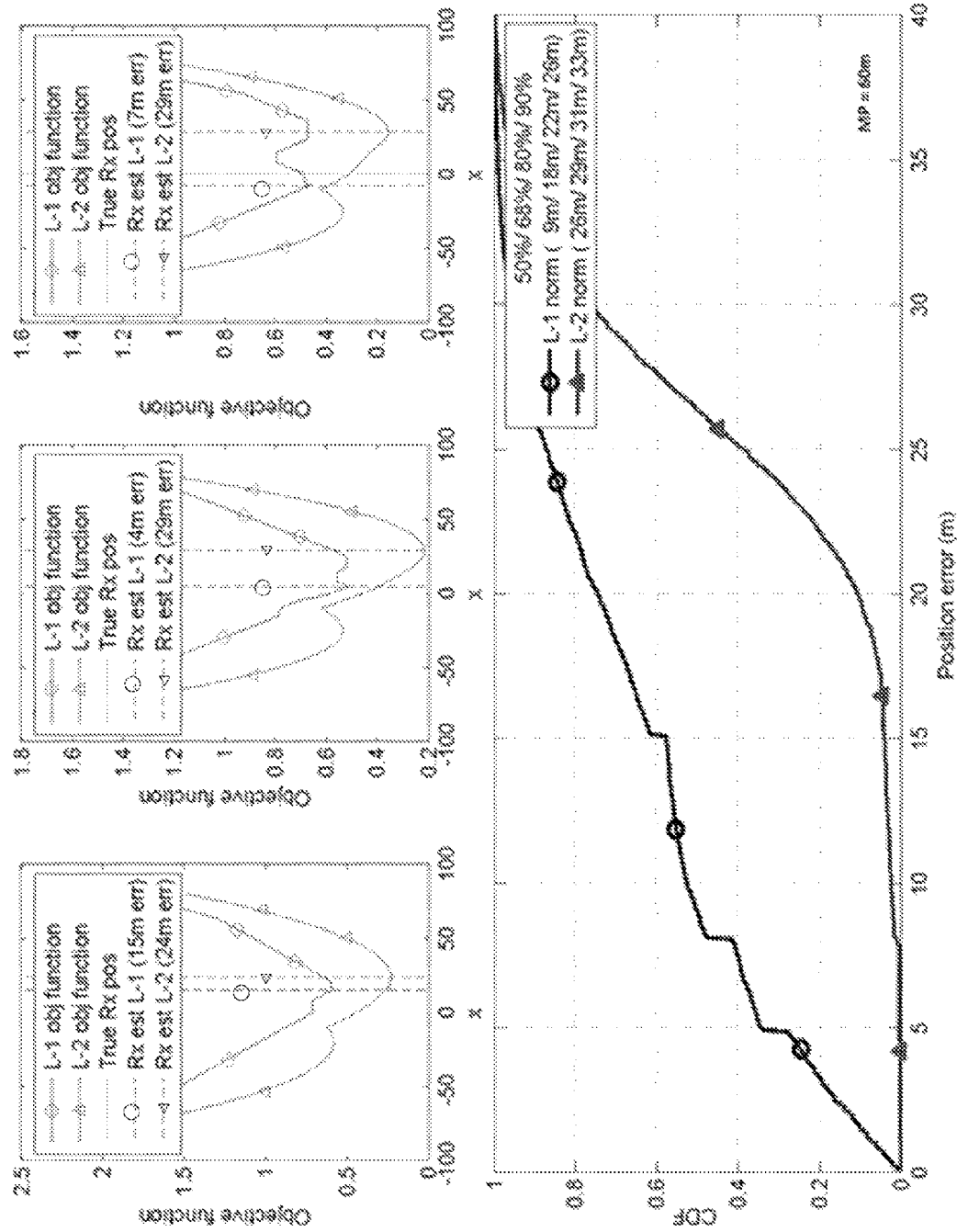
FIG. 13 depicts a fourth modeled scenario comparing two objective functions in which a multipath value is a fourth value.

By way of example, in FIG. 11, multiple local minima are shown. In order to select the global minimum, the global optimization function may be used.

Additional Aspects

Functionality and operation disclosed herein may be embodied as one or more methods implemented, in whole or in part, by machine(s)—e.g., processor(s), computers, or other suitable means known in the art—at one or more locations, which enhances the functionality of those machines, as well as computing devices that incorporate those machines. Non-transitory machine-readable media embodying program instructions adapted to be executed to implement the method(s) are also contemplated. Execution of the program instructions by one or more processors cause the processors to carry out the method(s).

It is noted that method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency.

By way of example, not by way of limitation, method(s) and processor(s) or other means for estimating one or more positions of a receiver using signals received from a network of transmitters may: estimate first latitude and first longitude of first position of a receiver using a first objective function that calculates an L-1 norm of residuals.

Method(s) and processor(s) or other means may further or alternatively: determine whether to estimate the first latitude and the first longitude using the first objective function or a second objective function that calculates an L-2 norm of residuals, wherein the determination is based on one or more of: (1) data specifying a geographical region of the receiver, (2) data specifying whether the receiver is indoors or outdoors, or (3) data specifying one or more characteristics of one or more signals received by the receiver from one or more transmitters.

Method(s) and processor(s) or other means may further or alternatively: determine whether to estimate the first latitude and the first longitude using the first objective function or the second objective function based on two or more of: (1) data specifying a geographical region of the receiver, (2) data specifying whether the receiver is indoors or outdoors, or (3) data specifying one or more characteristics of one or more signals received by the receiver from one or more transmitters.

Method(s) and processor(s) or other means may further or alternatively: determine whether to estimate the first latitude and the first longitude using the first objective function or the second objective function based on: (1) data specifying a geographical region of the receiver, (2) data specifying whether the receiver is indoors or outdoors, and (3) data specifying one or more characteristics of one or more signals received by the receiver from one or more transmitters.

Method(s) and processor(s) or other means may further or alternatively: estimate the first latitude and the first longitude using the first objective function instead of the second objective function based on a cell ID, one or more satellite signals, one or more local area network signals (e.g., Wi-Fi signals, Bluetooth signals, or other), or one or more other signals not received from the network of transmitters.

Method(s) and processor(s) or other means may further or alternatively: estimate the first latitude and the first longitude using the first objective function instead of the second objective function when the data specifying the geographical region of the receiver indicates that the receiver is located in a first of at least two types of environments.

Method(s) and processor(s) or other means may further or alternatively: estimate the first latitude and the first longitude using the first objective function instead of the second objective function when the data specifying the geographical region of the receiver indicates that the receiver is located in a first geographic region that includes more than a predefined number of buildings with heights that exceed a threshold height.

Method(s) and processor(s) or other means may further or alternatively: estimate the first latitude and the first longitude using the first objective function instead of the second objective function when the data specifying whether the receiver is indoors or outdoors indicates that the receiver is indoors.

Method(s) and processor(s) or other means may further or alternatively: estimate the first latitude and the first longitude using the first objective function instead of the second objective function when the data specifying the one or more characteristics indicates that each of the one or more signals meets a predefined multipath condition.

Method(s) and processor(s) or other means may further or alternatively: estimate the first latitude and the first longitude using the first objective function instead of the second objective function when the data specifying the one or more characteristics indicates that one or more pseudorange measurements corresponding to the one or more signals each include a multipath error that exceeds a threshold amount of error.

Method(s) and processor(s) or other means may further or alternatively: determine whether to estimate a second latitude and a second longitude of a second position of the receiver using the first objective function or a second objective function that calculates an L-2 norm of residuals, wherein the determination is based on data specifying a geographical region of the receiver; and estimate the second latitude and the second longitude using the second objective function instead of the first objective function when the data specifying the geographical region of the receiver indicates that the receiver is not located in a first of at least two types of environments.

Method(s) and processor(s) or other means may further or alternatively: determine whether to estimate a second latitude and a second longitude of a second position of the receiver using the first objective function or a second objective function that calculates an L-2 norm of residuals, wherein the determination is based on data specifying a geographical region of the receiver; and estimate the second latitude and the second longitude using the second objective function instead of the first objective function when the data specifying the geographical region of the receiver indicates that the receiver is located in a second geographic region that includes no more than the predefined number of buildings with heights that exceed the threshold height.

Method(s) and processor(s) or other means may further or alternatively: determine whether to estimate a second latitude and a second longitude of a second position of the receiver using the first objective function or a second objective function that calculates an L-2 norm of residuals, wherein the determination is based on data specifying whether the receiver is indoors or outdoors; and estimate the second latitude and the second longitude using the second objective function instead of the first objective function when the data specifying whether the receiver is indoors or outdoors indicates that the receiver is outdoors.

Method(s) and processor(s) or other means may further or alternatively: determine whether to estimate a second latitude and a second longitude of a second position of the receiver using the first objective function or a second objective function that calculates an L-2 norm of residuals, wherein the determination is based on data specifying one or more characteristics of one or more signals received by the receiver from one or more transmitters; and estimate the second latitude and the second longitude using the second objective function instead of the first objective function when the data specifying the one or more characteristics indicates that each of the one or more signals does not meet a predefined multipath condition.

Method(s) and processor(s) or other means may further or alternatively: determine whether to estimate a second latitude and a second longitude of a second position of the receiver using the first objective function or a second objective function that calculates an L-2 norm of residuals, wherein the determination is based on data specifying one or more characteristics of one or more signals received by the receiver from one or more transmitters; and estimate the second latitude and the second longitude using the second objective function instead of the first objective function when the data specifying the one or more characteristics indicates that no pseudorange measurement corresponding to the one or more signals includes a multipath error that exceeds a threshold amount of error.

Method(s) and processor(s) or other means may further or alternatively: estimate the first latitude and the first longitude using a second objective function that calculates an L-2 norm of residuals; estimate movement of the receiver from an initial position to the first position using a sensor of the receiver; select the estimates resulting from the first objective function or the estimates resulting from the second objective function based on the estimated movement.

Method(s) and processor(s) or other means may further or alternatively: use selected estimates to estimate the first position of the receiver.

Method(s) and processor(s) or other means may further or alternatively: estimate the first latitude and the first longitude using a second objective function that calculates an L-2 norm of residuals; use a sensor of the receiver to estimate movement of the receiver from an initial position to the first position; estimate the first latitude and the first longitude based on the estimated movement and initial latitude and initial longitude of the initial position; and select between the estimates resulting from the first objective function and the estimates resulting from the second objective function based on a first comparison between the estimates resulting from the first objective function and the estimates based on the estimated movement of the receiver, and further based on a second comparison between the estimates resulting from the second objective function and the estimates based on the estimated movement of the receiver.

Method(s) and processor(s) or other means may further or alternatively: determine an adjusted objective function that does not have a time bias parameter by inserting a time bias function into an objective function, wherein the time bias function includes a weighted median when the adjusted objective function is the first objective function, and wherein the time bias function includes a weighted mean when the adjusted objective function is a second objective function that calculates an L-2 norm of residuals.

In one embodiment, the adjusted objective function is the first objective function, and wherein the first latitude and the first longitude are estimated using the adjusted objective function.

In one embodiment, the adjusted objective function is the second objective function, and the method(s) and processor(s) or other means may further or alternatively: estimate a second latitude and a second longitude of a second position of the receiver using the adjusted objective function.

Method(s) and processor(s) or other means may further or alternatively: compute an estimate of a first altitude corresponding to the first position of the receiver using a measurement of pressure from the receiver, wherein the first latitude and the first longitude are estimated by inputting the estimate of the first altitude into the first objective function.

Method(s) and processor(s) or other means may further or alternatively: determine a global minimum from among two or more local minimums of the first objective function using a global optimization function that is based on a differential evolution approach for determining the global minimum.

Method(s) and processor(s) or other means may further or alternatively: estimate a first altitude corresponding to the first position of the receiver using the first objective function.

In one embodiment, the residuals are pseudorange residuals.

By way of example, not by way of limitation, one or more apparatuses may comprise hardware modules that perform the methods or particular steps of the methods disclosed herein. In one embodiment, one or more apparatuses include: a determination module configured to determine whether to estimate a first latitude and a first longitude using a first objective function that calculates an L-1 norm of residual or a second objective function that calculates an L-2 norm of residuals; and an estimation module configured to estimate the first latitude and the first longitude using the determined objective function. The determination module includes inputs to receive information used to make the determination, and further includes outputs to send information specifying what was determined. The estimation module includes inputs to receive information used to estimate the first latitude and the first longitude, and further includes outputs to send the estimated first latitude and first longitude.

Examples of Other Features in Some Embodiments

A "receiver" may be in the form of a computing device (e.g., a mobile phone, a tablet, a PDA, a laptop, a digital camera, a tracking tag). A receiver may also take the form of any component of the computer, including a processor.

Processing by the receiver can also occur at a server.

The illustrative methods described herein may be implemented, performed, or otherwise controlled by suitable hardware known or later-developed by one of skill in the art, or by firmware or software executed by processor(s), or any combination of hardware, software and firmware. Software may be downloadable and non-downloadable at a particular system. Such software, once loaded on a machine, changes the operation of that machine.

Systems on which methods described herein are performed may include one or more means that implement those methods. For example, such means may include processor(s) or other hardware that, when executing instructions (e.g., embodied in software or firmware), perform any method step disclosed herein. A processor may include, or be included within, a computer or computing device, a controller, an integrated circuit, a "chip", a system on a chip, a server, other programmable logic devices, other circuitry, or any combination thereof.

"Memory" may be accessible by a machine (e.g., a processor), such that the machine can read/write information from/to the memory. Memory may be integral with or separate from the machine. Memory may include a non-transitory machine-readable medium having machine-readable program code (e.g., instructions) embodied therein that is adapted to be executed to implement any or all of the methods and method steps disclosed herein. Memory may include any available storage media, including removable, non-removable, volatile, and non-volatile media—e.g., integrated circuit media, magnetic storage media, optical storage media, or any other computer data storage media. As used herein, machine-readable media includes all forms of machine-readable media except to the extent that such media is deemed to be non-statutory (e.g., transitory propagating signals).

All of the information disclosed herein may be represented by data, and that data may be transmitted over any communication pathway using any protocol, stored on data source(s), and processed by a processor. Transmission of data may be carried out using a variety of wires, cables, radio signals and infrared light beams, and an even greater variety of connectors, plugs and protocols even if not shown or explicitly described. Systems may exchange information with each other using any communication technology. Data, instructions, commands, information, signals, bits, symbols, and chips and the like may be represented by voltages, currents, electromagnetic waves, magnetic fields or particles, or optical fields or particles.

Features in system figures that are illustrated as rectangles may refer to hardware, firmware or software. It is noted that lines linking two such features may be illustrative of data transfer between those features. Such transfer may occur directly between those features or through intermediate features. Where no line connects two features, transfer of data between those features is contemplated unless otherwise stated.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

It is noted that the term "GPS" may refer to any Global Navigation Satellite Systems (GNSS), such as GLONASS, Galileo, and Compass/Beidou, and vice versa.

In many cases, L-1 norm minimizes the sum of absolute differences between a target value and estimated values of the target value. In many cases, L-2 norm minimizes the sum of the square of the differences between a target value and estimated values of the target value.

Certain aspects disclosed herein relate to a positioning system that estimates the positions of things—e.g., where the position is represented in terms of: latitude, longitude, and/or altitude coordinates; x, y, and/or z coordinates; angular coordinates; or other representations. Positioning systems use various techniques to estimate the position of an thing (e.g., a mobile device), including trilateration, which is the process of using geometry to estimate the position using distances traveled by different "ranging" signals that are received by the mobile device from different beacons (e.g., transmitters, satellites, antennas). If the transmission time and reception time of a ranging signal are known, then the difference between those times multiplied by speed of light would provide an estimate of the distance traveled by that ranging signal. These estimates of distance are often referred to as "range" measurements. When errors in the measured time(s) are present, a "range" measurement is typically referred to as a "pseudorange" measurement. Thus, a "pseudorange" measurement is a type of "range" measurement. Positioning systems and methods that estimate a position of a mobile device based on signaling from beacons (e.g., transmitters, and/or satellites) are described in co-assigned U.S. Pat. No. 8,130,141, issued Mar. 6, 2012, and U.S. patent application Ser. No. 13/296,067, filed Nov. 14, 2011.

The invention claimed is:

1. A computer-implemented method for determining how to estimate one or more positions of a receiver, wherein the method comprises:
   determining whether to estimate a first latitude and a first longitude of a first position of the receiver using a first objective function that calculates an L-1 norm of residuals or a second objective function that calculates an L-2 norm of residuals,
   wherein the determination is based on one or more of:—(1) data specifying a geographical region in which the receiver is located, (2) data specifying whether the receiver is indoors or outdoors, or (3) data specifying whether a signal received by the receiver from a transmitter meets a predefined multipath condition.

2. The method of claim 1, wherein determining whether to estimate the first latitude and the first longitude using the first objective function or the second objective function comprises:
- determining to use the first objective function instead of the second objective function to estimate the first latitude and the first longitude based on a cell ID, one or more satellite signals, or one or more local area network signals; and
- after determining to use the first objective function instead of the second objective function to estimate the first latitude and the first longitude, estimating the first latitude and the first longitude using the first objective function.

3. The method of claim 1, wherein determining whether to estimate the first latitude and the first longitude using the first objective function or the second objective function comprises:
- determining whether to estimate the first latitude and the first longitude using the first objective function or the second objective function based on the data specifying the geographical region in which the receiver is located;
- determining to use the first objective function instead of the second objective function to estimate the first latitude and the first longitude when the data specifying the geographical region in which the receiver is located indicates that the receiver is located in a first type of environment of at least two types of environments; and
- after determining to use the first objective function instead of the second objective function to estimate the first latitude and the first longitude, estimating the first latitude and the first longitude using the first objective function.

4. The method of claim 1, wherein determining whether to estimate the first latitude and the first longitude using the first objective function or the second objective function comprises:
- determining whether to estimate the first latitude and the first longitude using the first objective function or the second objective function based on the data specifying the geographical region in which the receiver is located;
- determining to use the first objective function instead of the second objective function to estimate the first latitude and the first longitude when the data specifying the geographical region in which the receiver is located indicates that the geographical region includes more than a predefined number of buildings with heights that exceed a threshold height; and
- after determining to use the first objective function instead of the second objective function to estimate the first latitude and the first longitude, estimating the first latitude and the first longitude using the first objective function.

5. The method of claim 1, wherein determining whether to estimate the first latitude and the first longitude using the first objective function or the second objective function comprises:
- determining whether to estimate the first latitude and the first longitude using the first objective function or the second objective function based on the data specifying whether the receiver is indoors or outdoors;
- determining to use the first objective function instead of the second objective function to estimate the first latitude and the first longitude when the data specifying whether the receiver is indoors or outdoors indicates that the receiver is indoors; and
- after determining to use the first objective function instead of the second objective function to estimate the first latitude and the first longitude, estimating the first latitude and the first longitude using the first objective function.

6. The method of claim 1, wherein determining whether to estimate the first latitude and the first longitude using the first objective function or the second objective function comprises:
- determining whether to estimate the first latitude and the first longitude using the first objective function or the second objective function based on the data specifying whether the signal received by the receiver from the transmitter meets the predefined multipath condition;
- determining to use the first objective function instead of the second objective function to estimate the first latitude and the first longitude when the data specifying whether the signal received by the receiver meets the predefined multipath condition indicates that the signal meets the predefined multipath condition; and
- after determining to use the first objective function instead of the second objective function to estimate the first latitude and the first longitude, estimating the first latitude and the first longitude using the first objective function.

7. The method of claim 1, wherein determining whether to estimate the first latitude and the first longitude using the first objective function or the second objective function comprises:
- determining whether to estimate the first latitude and the first longitude using the first objective function or the second objective function based on the data specifying whether the signal received by the receiver from the transmitter meets the predefined multipath condition;
- determining to use the first objective function instead of the second objective function to estimate the first latitude and the first longitude when the data specifying whether the signal received by the receiver meets the predefined multipath condition indicates that a pseudorange measurements corresponding to the signals includes a multipath error that exceeds a threshold amount of error; and
- after determining to use the first objective function instead of the second objective function to estimate the first latitude and the first longitude, estimating the first latitude and the first longitude using the first objective function.

8. The method of claim 1, wherein the method further comprises:
- estimating a second latitude and a second longitude of a second position of the receiver using the first objective function;
- estimating the second latitude and the second longitude using the second objective function;
- using a sensor of the receiver to estimate movement of the receiver to the second position from a previously occupied position of the receiver;
- selecting, based on the estimated movement, either the estimates of the second latitude and the second longitude resulting from the first objective function, or the estimates of the second latitude and second first longitude resulting from the second objective function; and
- using the selected estimates to generate an estimate of the second position of the receiver.

9. The method of claim 1, wherein the method further comprises:
- estimating a second latitude and a second longitude of a second position of the receiver using the first objective function;
- estimating the second latitude and the second longitude using the second objective function;
- using a sensor of the receiver to estimate movement of the receiver to the second position from a previously occupied position of the receiver;
- estimating the second latitude and the second longitude using the estimated movement in addition to estimated latitude and longitude coordinates of the previously occupied position;
- selecting between the estimates of the second latitude and the second longitude resulting from the first objective function and the estimates of the second latitude and the second longitude resulting from the second objective function based on a first comparison between the estimates of the second latitude and the second longitude resulting from the first objective function and the estimates of the second latitude and the second longitude that were estimated using the estimated movement of the receiver in addition to the estimated latitude and the longitude coordinates of the previously occupied position, and further based on a second comparison between the estimates of the second latitude and the second longitude resulting from the second objective function and the estimates of the second latitude and the second longitude that were estimated using the estimated movement of the receiver in addition to the estimated latitude and the longitude coordinates of the previously occupied position; and
- using the selected estimates to generate an estimate of the second position of the receiver.

10. The method of claim 1, wherein the method further comprises:
- determining the first objective function by inserting a first time bias function that includes a weighted median into an objective function; and
- determining the second objective function by inserting a second time bias function that includes a weighted mean into the objective function.

11. The method of claim 1, wherein the method further comprises:
- computing an estimate of a first altitude corresponding to the first position of the receiver using a pressure value measured by a sensor of the receiver, wherein the first latitude and the first longitude are estimated by inputting the estimate of the first altitude into the first objective function or into the second objective function.

12. The method of claim 1, wherein the method further comprises:
- determining a global minimum from among two or more local minimums of the first objective function using a global optimization function that is based on a differential evolution approach for determining the global minimum.

13. The method of claim 1, wherein determining whether to estimate the first latitude and the first longitude using the first objective function or the second objective function comprises:
- determining whether to estimate the first latitude and the first longitude using the first objective function or the second objective function based on the data specifying the geographical region in which the receiver is located;
- determining to use the second objective function instead of the first objective function to estimate the first latitude and the first longitude when the data specifying the geographical region in which the receiver is located indicates that the receiver is not located in a first type of environment of at least two types of environments; and
- after determining to use the second objective function instead of the first objective function to estimate the first latitude and the first longitude, estimating the first latitude and the first longitude using the second objective function.

14. The method of claim 1, wherein determining whether to estimate the first latitude and the first longitude using the first objective function or the second objective function comprises:
- determining whether to estimate the first latitude and the first longitude using the first objective function or the second objective function based on the data specifying the geographical region in which the receiver is located;
- determining to use the second objective function instead of the first objective function to estimate the first latitude and the first longitude when the data specifying the geographical region in which the receiver is located indicates that the geographical region includes no more than a predefined number of buildings with heights that exceed a threshold height; and
- after determining to use the second objective function instead of the first objective function to estimate the first latitude and the first longitude, estimating the first latitude and the first longitude using the second objective function.

15. The method of claim 1, wherein determining whether to estimate the first latitude and the first longitude using the first objective function or the second objective function comprises:
- determining whether to estimate the first latitude and the first longitude using the first objective function or the second objective function based on the data specifying whether the receiver is indoors or outdoors;
- determining to use the second objective function instead of the first objective function to estimate the first latitude and the first longitude when the data specifying whether the receiver is indoors or outdoors indicates that the receiver is outdoors; and
- after determining to use the second objective function instead of the first objective function to estimate the first latitude and the first longitude, estimating the first latitude and the first longitude using the second objective function.

16. The method of claim 1, wherein determining whether to estimate the first latitude and the first longitude using the first objective function or the second objective function comprises:
- determining whether to estimate the first latitude and the first longitude using the first objective function or the second objective function based on the data specifying whether the signal received by the receiver from the transmitter meets the predefined multipath condition;
- determining to use the second objective function instead of the first objective function to estimate the first latitude and the first longitude when the data specifying whether the signal received by the receiver meets the predefined multipath condition indicates that the signal does not meet the predefined multipath condition; and after determining to use the second objective function instead of the first objective function to estimate the first latitude and the first longitude, estimating the first latitude and the first longitude using the second objective function.

17. The method of claim 1, wherein determining whether to estimate the first latitude and the first longitude using the first objective function or the second objective function comprises:

determining whether to estimate the first latitude and the first longitude using the first objective function or the second objective function based on the data specifying whether the signal received by the receiver from the transmitter meets the predefined multipath condition;

determining to use the second objective function instead of the first objective function to estimate the first latitude and the first longitude when the data specifying whether the signal received by the receiver meets the predefined multipath condition indicates that a pseudorange measurement corresponding to the signal does not include a multipath error that exceeds a threshold amount of error; and after determining to use the second objective function instead of the first objective function to estimate the first latitude and the first longitude, estimating the first latitude and the first longitude using the second objective function.

18. One or more non-transitory machine-readable media embodying program instructions that, when executed by one or more machines, cause the one or more machines to implement a method for determining how to estimate one or more positions of a receiver, wherein the method comprises:

determining whether to estimate a first latitude and a first longitude of a first position of the receiver using a first objective function that calculates an L-1 norm of residuals or a second objective function that calculates an L-2 norm of residuals, wherein the determination is based on one or more of: (1) data specifying a geographical region in which the receiver is located, (2) data specifying whether the receiver is indoors or outdoors, or (3) data specifying whether a signal received by the receiver from a transmitter meets a predefined multipath condition.

19. The one or more non-transitory machine-readable media of claim 18, wherein determining whether to estimate the first latitude and the first longitude using the first objective function or the second objective function comprises:

determining to use the first objective function instead of the second objective function to estimate the first latitude and the first longitude based on a cell ID, one or more satellite signals, or one or more local area network signals; and after determining to use the first objective function instead of the second objective function to estimate the first latitude and the first longitude, estimating the first latitude and the first longitude using the first objective function.

20. The one or more non-transitory machine-readable media of claim 18, wherein determining whether to estimate the first latitude and the first longitude using the first objective function or the second objective function comprises:

determining whether to estimate the first latitude and the first longitude using the first objective function or the second objective function based on the data specifying the geographical region in which the receiver is located;

determining to use the first objective function instead of the second objective function to estimate the first latitude and the first longitude when the data specifying the geographical region in which the receiver is located indicates that the receiver is located in a first type of environment of at least two types of environments; and after determining to use the first objective function instead of the second objective function to estimate the first latitude and the first longitude, estimating the first latitude and the first longitude using the first objective function.

21. The one or more non-transitory machine-readable media of claim 18, wherein determining whether to estimate the first latitude and the first longitude using the first objective function or the second objective function comprises:

determining whether to estimate the first latitude and the first longitude using the first objective function or the second objective function based on the data specifying the geographical region in which the receiver is located;

determining to use the first objective function instead of the second objective function to estimate the first latitude and the first longitude when the data specifying the geographical region in which the receiver is located indicates that the geographical region includes more than a predefined number of buildings with heights that exceed a threshold height; and after determining to use the first objective function instead of the second objective function to estimate the first latitude and the first longitude, estimating the first latitude and the first longitude using the first objective function.

22. The one or more non-transitory machine-readable media of claim 18, wherein determining whether to estimate the first latitude and the first longitude using the first objective function or the second objective function comprises:

determining whether to estimate the first latitude and the first longitude using the first objective function or the second objective function based on the data specifying whether the receiver is indoors or outdoors;

determining to use the first objective function instead of the second objective function to estimate the first latitude and the first longitude when the data specifying whether the receiver is indoors or outdoors indicates that the receiver is indoors; and after determining to use the first objective function instead of the second objective function to estimate the first latitude and the first longitude, estimating the first latitude and the first longitude using the first objective function.

23. The one or more non-transitory machine-readable media of claim 18, wherein determining whether to estimate the first latitude and the first longitude using the first objective function or the second objective function comprises:

determining whether to estimate the first latitude and the first longitude using the first objective function or the second objective function based on the data specifying whether the signal received by the receiver from the transmitter meets the predefined multipath condition;

determining to use the first objective function instead of the second objective function to estimate the first latitude and the first longitude when the data specifying whether the signal received by the receiver meets the predefined multipath condition indicates that the signal meets the predefined multipath condition; and after determining to use the first objective function instead of the second objective function to estimate the first latitude and the first longitude, estimating the first latitude and the first longitude using the first objective function.

24. The one or more non-transitory machine-readable media of claim 18, wherein determining whether to estimate the first latitude and the first longitude using the first objective function or the second objective function comprises:

determining whether to estimate the first latitude and the first longitude using the first objective function or the second objective function based on the data specifying whether the signal received by the receiver from the transmitter meets the predefined multipath condition;

determining to use the first objective function instead of the second objective function to estimate the first latitude and the first longitude when the data specifying whether the signal received by the receiver meets the predefined multipath condition indicates that a pseudorange measurement corresponding to the signal includes a multipath error that exceeds a threshold amount of error; and after determining to use the first objective function instead of the second objective function to estimate the first latitude and the first longitude, estimating the first latitude and the first longitude using the first objective function.

25. The one or more non-transitory machine-readable media of claim 18, wherein the method further comprises:

estimating a second latitude and a second longitude of a second position of the receiver using the first objective function;

estimating the second latitude and the second longitude using the second objective function;

using a sensor of the receiver to estimate movement of the receiver to the second position from a previously occupied position of the receiver;

selecting, based on the estimated movement, either the estimates of the second latitude and the second longitude resulting from the first objective function, or the estimates of the second latitude and second first longitude resulting from the second objective function; and using the selected estimates to generate an estimate of the second position of the receiver.

26. The one or more non-transitory machine-readable media of claim 18, wherein the method further comprises:

estimating a second latitude and a second longitude of a second position of the receiver using the first objective function;

estimating the second latitude and the second longitude using the second objective function;

using a sensor of the receiver to estimate movement of the receiver to the second position from a previously occupied position of the receiver;

estimating the second latitude and the second longitude using the estimated movement in addition to estimated latitude and longitude coordinates of the previously occupied position;

selecting between the estimates of the second latitude and the second longitude resulting from the first objective function and the estimates of the second latitude and the second longitude resulting from the second objective function based on a first comparison between the estimates of the second latitude and the second longitude resulting from the first objective function and the estimates of the second latitude and the second longitude that were estimated using the estimated movement of the receiver in addition to the estimated latitude and the longitude coordinates of the previously occupied position, and further based on a second comparison between the estimates of the second latitude and the second longitude resulting from the second objective function and the estimates of the second latitude and the second longitude that were estimated using the estimated movement of the receiver in addition to the estimated latitude and the longitude coordinates of the previously occupied position; and using the selected estimates to generate an estimate of the second position of the receiver.

27. The one or more non-transitory machine-readable media of claim 18, wherein the method further comprises:

determining the first objective function by inserting a first time bias function that includes a weighted median into an objective function; and determining the second objective function by inserting a second time bias function that includes a weighted mean into the objective function.

28. The one or more non-transitory machine-readable media of claim 18, wherein the method further comprises:

computing an estimate of a first altitude corresponding to the first position of the receiver using a pressure value measured by a sensor of the receiver, wherein the first latitude and the first longitude are estimated by inputting the estimate of the first altitude into the first objective function or into the second objective function.

29. The one or more non-transitory machine-readable media of claim 18, wherein the method further comprises:

determining a global minimum from among two or more local minimums of the first objective function using a global optimization function that is based on a differential evolution approach for determining the global minimum.

30. The one or more non-transitory machine-readable media of claim 18, wherein determining whether to estimate the first latitude and the first longitude using the first objective function or the second objective function comprises:

determining whether to estimate the first latitude and the first longitude using the first objective function or the second objective function based on the data specifying the geographical region in which the receiver is located;

determining to use the second objective function instead of the first objective function to estimate the first latitude and the first longitude when the data specifying the geographical region in which the receiver is located indicates that the receiver is not located in a first type of environment of at least two types of environments; and after determining to use the second objective function instead of the first objective function to estimate the first latitude and the first longitude, estimating the first latitude and the first longitude using the second objective function.

31. The one or more non-transitory machine-readable media of claim 18, wherein determining whether to estimate the first latitude and the first longitude using the first objective function or the second objective function comprises:
- determining whether to estimate the first latitude and the first longitude using the first objective function or the second objective function based on the data specifying the geographical region in which the receiver is located;
- determining to use the second objective function instead of the first objective function to estimate the first latitude and the first longitude when the data specifying the geographical region in which the receiver is located indicates that the geographical region includes no more than a predefined number of buildings with heights that exceed a threshold height; and
- after determining to use the second objective function instead of the first objective function to estimate the first latitude and the first longitude, estimating the first latitude and the first longitude using the second objective function.

32. The one or more non-transitory machine-readable media of claim 18, wherein determining whether to estimate the first latitude and the first longitude using the first objective function or the second objective function comprises:
- determining whether to estimate the first latitude and the first longitude using the first objective function or the second objective function based on the data specifying whether the receiver is indoors or outdoors;
- determining to use the second objective function instead of the first objective function to estimate the first latitude and the first longitude when data specifying whether the receiver is indoors or outdoors indicates that the receiver is outdoors; and
- after determining to use the second objective function instead of the first objective function to estimate the first latitude and the first longitude, estimating the first latitude and the first longitude using the second objective function.

33. The one or more non-transitory machine-readable media of claim 18, wherein determining whether to estimate the first latitude and the first longitude using the first objective function or the second objective function comprises:
- determining whether to estimate the first latitude and the first longitude using the first objective function or the second objective function based on the data specifying whether the signal received by the receiver from the transmitter meets the predefined multipath condition;
- determining to use the second objective function instead of the first objective function to estimate the first latitude and the first longitude when the data specifying whether the signal received by the receiver meets the predefined multipath condition indicates that the signal does not meet the predefined multipath condition; and
- after determining to use the second objective function instead of the first objective function to estimate the first latitude and the first longitude, estimating the first latitude and the first longitude using the second objective function.

34. The one or more non-transitory machine-readable media of claim 18, wherein determining whether to estimate the first latitude and the first longitude using the first objective function or the second objective function comprises:
- determining whether to estimate the first latitude and the first longitude using the first objective function or the second objective function based on the data specifying whether the signal received by the receiver from the transmitter meets the predefined multipath condition;
- determining to use the second objective function instead of the first objective function to estimate the first latitude and the first longitude when the data specifying whether the signal received by the receiver meets the predefined multipath condition indicates that a pseudorange measurement corresponding to the signal does not include a multipath error that exceeds a threshold amount of error; and
- after determining to use the second objective function instead of the first objective function to estimate the first latitude and the first longitude, estimating the first latitude and the first longitude using the second objective function.

* * * * *